United States Patent
Yamada

(10) Patent No.: US 7,111,384 B2
(45) Date of Patent: Sep. 26, 2006

(54) METHOD FOR MANUFACTURING MAGNETIC HEAD INCLUDING COIL

(75) Inventor: Minoru Yamada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 503 days.

(21) Appl. No.: 10/715,590

(22) Filed: Nov. 18, 2003

(65) Prior Publication Data

US 2004/0103523 A1    Jun. 3, 2004

(30) Foreign Application Priority Data

Nov. 29, 2002   (JP) .............................. 2002-348368

(51) Int. Cl.
  *G11B 5/127*   (2006.01)
  *G11B 5/147*   (2006.01)
(52) U.S. Cl. ................ 29/603.07; 29/603.11; 29/603.13; 29/603.14; 29/603.23; 29/603.24; 29/603.26; 29/603.27; 360/126
(58) Field of Classification Search ............ 29/603.07, 29/603.01, 603.27, 603.11, 603.13, 603.14, 29/603.23, 603.24; 360/126, 122, 317, 123; 427/128, 130.9, 131, 132; 205/118, 119; 216/22
See application file for complete search history.

(56) References Cited

U.S. PATENT DOCUMENTS

| 6,195,872 | B1 * | 3/2001 | Sasaki ..................... 29/603.13 |
| 6,400,525 | B1 * | 6/2002 | Sasaki et al. ............... 360/123 |
| 6,477,004 | B1 * | 11/2002 | Sasaki ........................ 360/123 |
| 6,515,825 | B1 * | 2/2003 | Sato ........................... 360/126 |
| 6,519,834 | B1 * | 2/2003 | Sasaki ..................... 29/603.14 |
| 2002/0176206 | A1 | 11/2002 | Sato |

FOREIGN PATENT DOCUMENTS

| JP | 05-242430 | 9/1993 |
| JP | 6-103526 | 4/1994 |
| JP | 08/147625 | 6/1996 |
| JP | 2001-52309 | 2/2001 |
| JP | 2002-175607 | 6/2002 |

* cited by examiner

*Primary Examiner*—A. Dexter Tugbang
(74) *Attorney, Agent, or Firm*—Brinks Hofer Gilson & Lione

(57) ABSTRACT

A method for manufacturing a magnetic recording head includes the steps of forming a first lifting layer and a second lifting layer on a bottom core layer, forming an inorganic insulating layer in a gap between the first lifting layer and the second lifting layer, forming a groove in the inorganic insulating layer to form a coil layer, and forming the coil layer in the groove and over the groove by plating.

7 Claims, 9 Drawing Sheets

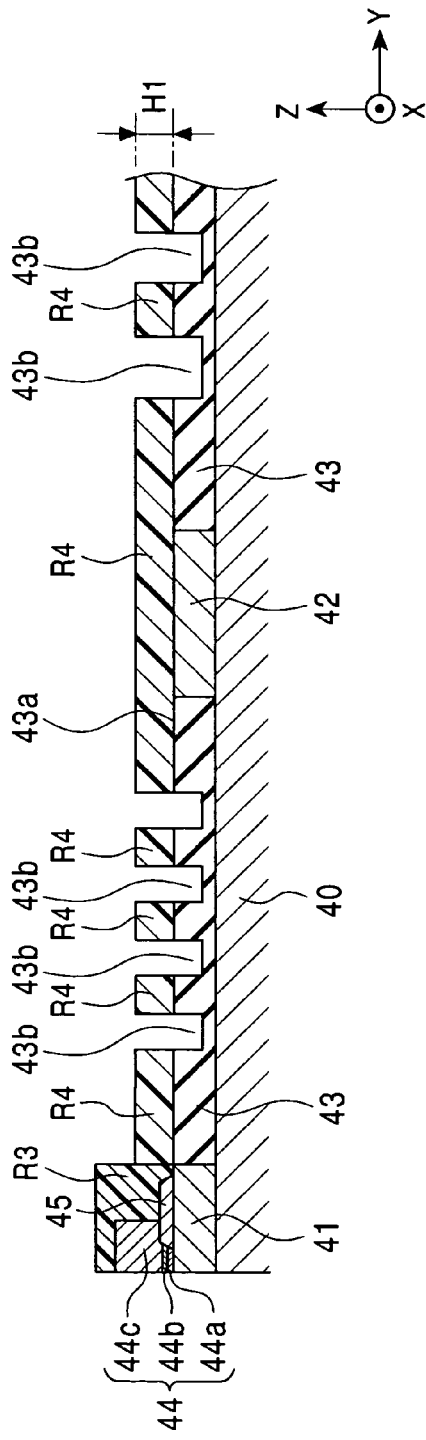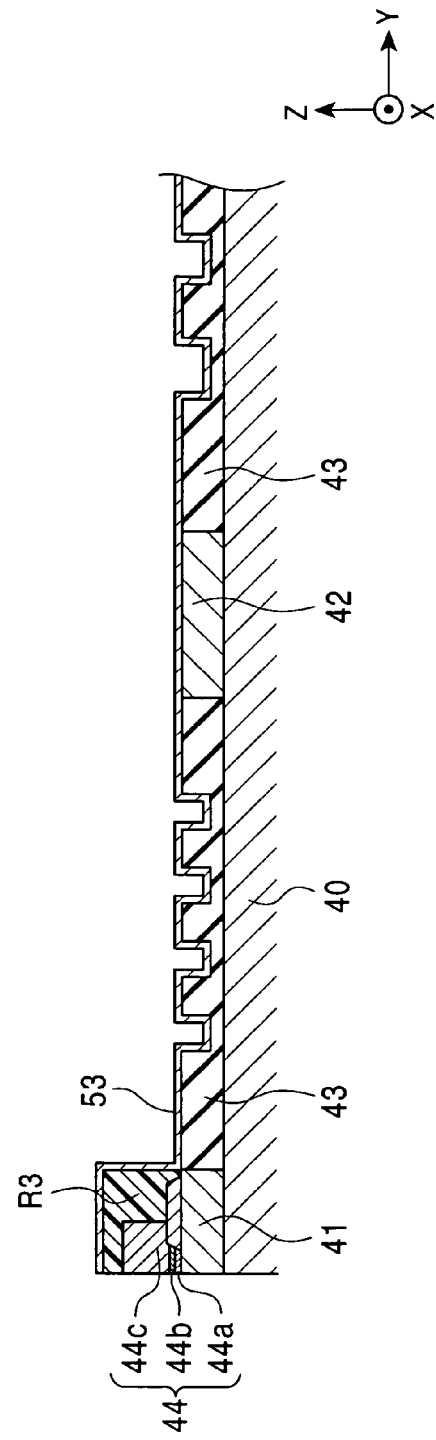

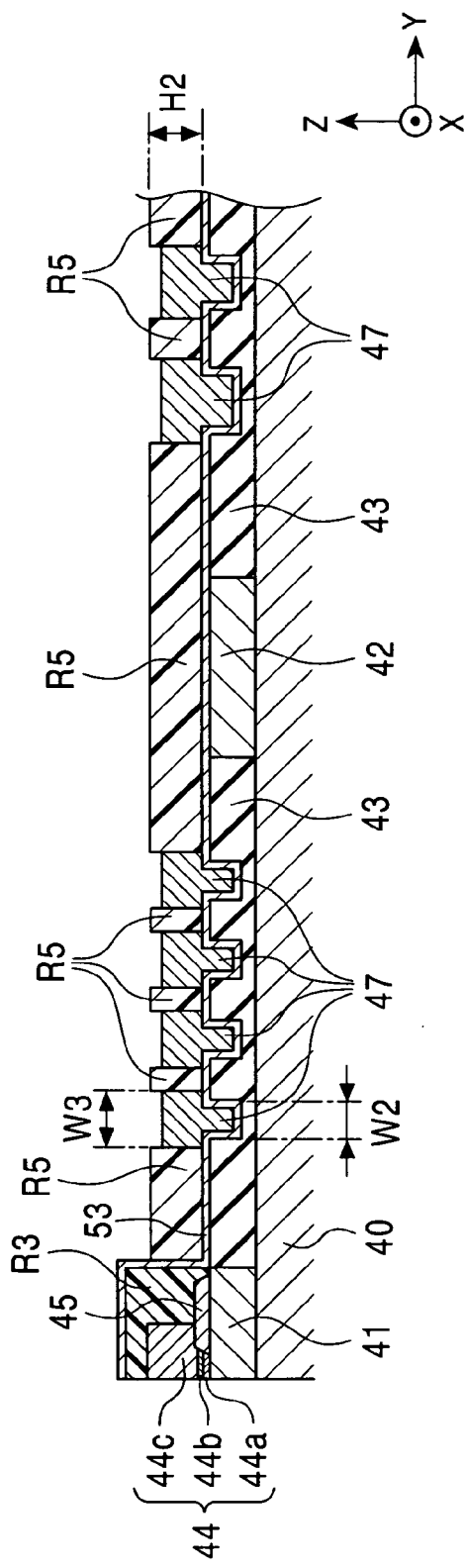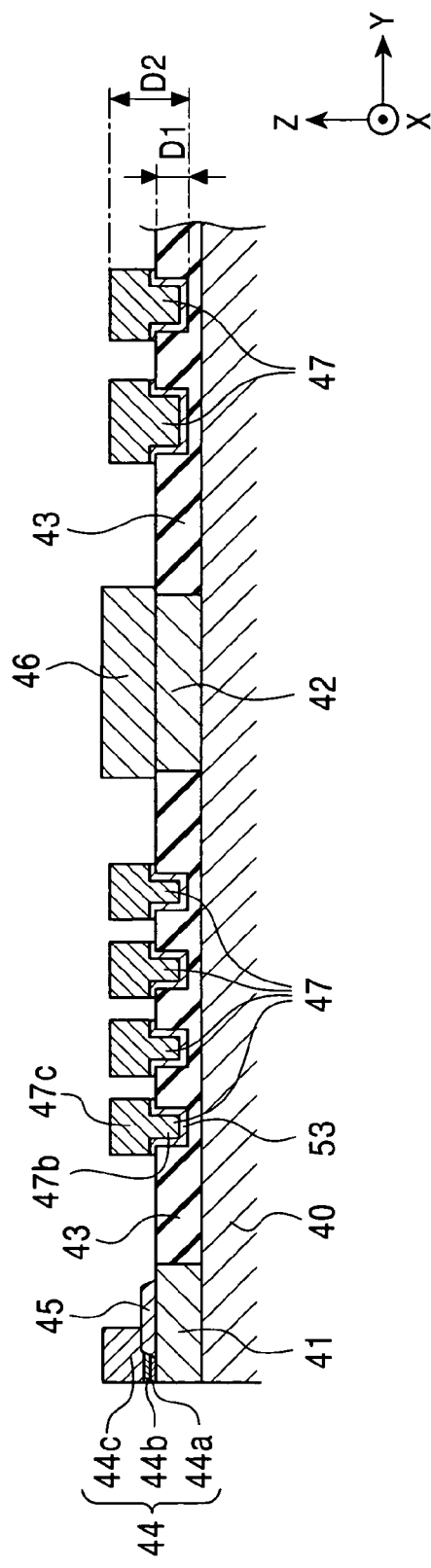

METHOD FOR MANUFACTURING MAGNETIC HEAD INCLUDING COIL

BACKGROUND OF THE INVENTION

1. Field of the Invention

The present invention relates to a magnetic head disposed at a trailing edge of a slider facing, for example, a magnetic recording medium, and in particular, to a method for manufacturing a magnetic head with a reduced thermal expansion due to a heat generation at a coil in the recording head.

2. Description of the Related Art

FIG. 14 is a partial longitudinal section illustrating a structure of a known magnetic head described in Japanese Unexamined Patent Application Publication No. 2001-52309. The thin-film magnetic head shown in FIG. 14 is an inductive head for recording.

According to the magnetic head shown in FIG. 14, (i.e., in particular shown in FIG. 2 in the patent document) a track width control portion 11 having a track width Tw is formed on a bottom core layer 10 composed of a soft magnetic material, such as Ni—Fe alloy. The track width control portion 11 has a layered structure including three layers, i.e., a bottom pole layer 12, a gap layer 13, and a top pole layer 14.

The length L1 of the track width control portion 11 is defined as a gap depth Gd of the magnetic head. The gap depth Gd is determined in advance to be a predetermined length, because the gap depth Gd greatly influences the electrical characteristics of the thin-film magnetic head.

A first coil layer 15 is formed at the back of the track width control portion 11 in a first direction (the height direction, i.e., the Y direction shown in FIG. 14). An insulating base layer 16 is formed between the bottom core layer 10 and the first coil layer 15 to insulate between both of the layers. The insulating base layer 16 is composed of, for example, Al₂O₃.

The first coil layer 15 is formed in a spiral pattern on the insulating base layer 16 with the first coil center 15a as the center. The first coil layer 15 is covered with a first insulating layer 17 composed of Al₂O₃.

A second coil layer 18 is formed in a spiral pattern on the first coil layer 15 with the first insulating layer 17 provided therebetween. The second coil center 18a of the second coil layer 18 is electrically connected to the first coil center 15a of the first coil layer 15.

The second coil layer 18 is covered with a second insulating layer 19 composed of an organic material such as a resist or polyimide. A top core layer 20 is patterned on the second insulating layer 19.

The top core layer 20 is formed such that the front end 20a is in contact with the track width control portion 11. The base end 20b of the top core layer 20 is magnetically connected to a lifting layer 21, which is composed of a magnetic material and is formed on the bottom core layer 10.

The bottom core layer 10, the bottom pole layer 12, the top pole layer 14, and the top core layer 20 are composed of a soft magnetic material, such as Ni—Fe alloy. The gap layer 13 is composed of a nonmagnetic material such as Ni—P alloy. The coil layers are composed of a conductive nonmagnetic material such as Cu.

In the inductive head according to FIG. 14, when a recording current is supplied to the first coil layer 15 and the second coil layer 18, a recording magnetic field is induced in the bottom core layer 10 and the top core layer 20. A leakage magnetic field is generated between the bottom pole layer 12 and the top pole layer 14, which are opposed to each other with the gap layer 13 provided therebetween in the track width control portion 11. A magnetic signal is recorded on a recording medium, for example, a hard disk by the leakage magnetic field.

In the inductive head shown in FIG. 14, the coil has the two-layered structure. Accordingly, the width T3 of the first coil layer 15 is decreased, thereby shortening the magnetic path formed from the bottom core layer 10 to the top core layer 20, thus decreasing inductance of the magnetic head and manufacturing a magnetic head adaptable to higher recording frequency.

According to a magnetic head disclosed in Japanese Unexamined Patent Application Publication No. 6-103526 (in particular disclosed in page 3 and FIG. 1 in the patent document), in order to decrease the coil resistance, coil layers at the rear end of the head have a thickness larger than the thickness of the coil layer at the top of the head covered with a top core layer and a bottom core layer. The coil resistance is decreased in this magnetic head, thereby suppressing the generation of thermal noise.

In a magnetic recording apparatus mounting a hard magnetic disk, the magnetic head described in the above patent documents is disposed on a slider, which floats over the magnetic disk with a minute distance.

According to the inductive magnetic head, the track width control portion 11 is expanded by the heat generation at the first coil layer 15 and protrudes from an air bearing surface (ABS), i.e., a face of the slider facing the recording medium.

Since a recording current applied to the first coil layer 15 has a high frequency, in particular, in a thin-film magnetic head for high recording density, the heat generation at the coil layer increases. The increase of the heat generation at the first coil layer 15 increases the thermal expansion of the track width control portion 11 and increases the amount of protrusion.

Furthermore, in a magnetic recording apparatus for high-density recording and high-speed recording, the gap between the recording medium and the slider is small. Accordingly, the protruded track width control portion 11 is frequently in contact with the magnetic recording medium, thus damaging the recording medium or the recording head itself.

In order to reduce the heat generation at the first coil layer 15, the first coil layer 15 must have a large cross-sectional area to reduce the resistance of the first coil layer 15. In particular, the resistance at the front portion of the first coil layer 15, i.e., the portion close to the track width control portion 11 rather than the lifting layer 21 must be reduced.

As described above, in order to reduce the inductance of the magnetic head by shortening the magnetic path formed from the bottom core layer 10 to the top core layer 20, the width T3 of the first coil layer 15 must be reduced. Accordingly, a width W1 of the first coil layer 15 (i.e., a width W1 in the Y direction shown in FIG. 14) cannot be increased.

A top face 11a of the track width control portion 11 must be flattened in order to ensure the junction between the top core layer 20 and the track width control portion 11. However, the magnetic head is too minute to flatten the top face 11a of the track width control portion 11 only. Accordingly, a top face of the 17a of the first insulating layer 17 becomes also flat. Since the first coil layer 15 must be covered with the first insulating layer 17, the top face of the first coil layer 15 cannot disposed above the top face of the 17a of the first insulating layer 17. That is, unlike the magnetic head described in Japanese Unexamined Patent Application Publication No. 6-103526, a plurality of coil layers cannot be simply stacked.

SUMMARY OF THE INVENTION

In order to overcome the problems described above, it is an object of the present invention to provide a method for manufacturing a magnetic head with reduced resistance of a coil layer by extending downward the coil layer disposed at least an area between a top core layer and a bottom core layer so as to increase the thickness of the coil layer.

A method for manufacturing a magnetic head according to the present invention includes the steps of (a) forming a bottom core layer by plating; (b) forming a first lifting layer composed of a magnetic material and a second lifting layer composed of a magnetic material such that a gap is formed between the first lifting layer and the second lifting layer in a first direction; (c) forming an inorganic insulating layer on the bottom core layer; (d) forming a groove having a plurality of turns in the inorganic insulating layer, the groove being disposed around the second lifting layer and the front portion of the groove being disposed between the first lifting layer and the second lifting layer; (e) forming a coil layer, having a plurality of turns and having a thickness larger than the depth of the groove, in the groove and the over the groove by continuous plating; (f) insulating each area between the turns of the coil layer with an insulating material; and (g) forming a gap layer composed of a non-magnetic material, and a top core layer composed of a magnetic material, the top core layer being connected to the second lifting layer and facing the first lifting layer with the gap layer provided therebetween.

According to the present invention, when the inorganic insulating layer is formed on the bottom core layer in step (c), the inorganic insulating layer is formed in an area between the first lifting layer and the second lifting layer. In step (d), a groove having a plurality of turns is formed in the inorganic insulating layer, which is disposed in an area between the first lifting layer and the second lifting layer. In step (e), a coil layer, having a plurality of turns and having a thickness larger than the depth of the groove, is formed in the groove and over the groove by continuous plating.

After performing the steps described above, the coil layer can be disposed at the area crossing over in the inorganic insulating layer and in the insulating layer disposed on the inorganic insulating layer. According to the magnetic head of the present invention, the thickness at the front area of the coil layer, which is disposed between the top core layer and the bottom core layer, can be increased as compared with a known magnetic head.

Furthermore, in step (e), the coil layer, having a plurality of turns and having a thickness larger than the depth of the groove, is formed in the groove and over the groove by continuous plating.

In the continuous plating, the coil layer is formed with a single plating bath and a current supply. More specifically, in the forming process of the coil layer, a sample is not taken out from the plating bath and is not soaked again in the plating bath on the way of plating.

According to the method for manufacturing a magnetic head of the present invention, the coil layer having a large thickness can be formed simply and rapidly. Furthermore, the coil layer is a conductive material layer being Pointless and having a uniform composition and a uniform structure.

The inorganic insulating layer composed of an inorganic material has a large thermal conductivity. Even though the coil layer is embedded in the inorganic insulating layer, heat generated from the coil layer is easily released.

According to the present invention, the resistance of the coil layer can be decreased by increasing the cross-sectional area of the coil layer. In particular, the resistance at the front portion of the coil layer, i.e., the portion close to the opposing face facing the recording medium rather than the second lifting layer can be reduced. Furthermore, the cross-sectional area is expanded by increasing the thickness of the coil layer. Accordingly, the dimension of the bottom core layer and the top core layer are maintained to be small, thereby preventing the inductance of the magnetic head from increasing.

Accordingly, the protrusion from the opposing face of the slider facing the recording medium, due to the expansion of the magnetic head by the heat from the coil layer, can be suppressed. In particular, even if a recording current applied to the coil layer has a high frequency in order to achieve a high recording density, the heat generation at the coil layer can be suppressed, thereby reducing the amount of protrusion.

In a magnetic recording apparatus for high-density recording and high-speed recording, the gap between the recording medium and the slider is small. According to the present invention, the amount of protrusion of the magnetic head can be reduced. Therefore, the magnetic head is not frequently in contact with the magnetic recording medium, thus preventing the damage of the recording medium or the recording head itself.

The method for manufacturing a magnetic head according to the present invention preferably includes the step of forming a part of track width control portion on the first lifting layer, the track width control portion including the gap layer and having a width smaller than the width of the front end of the top core layer, in a second direction orthogonal to the first direction.

The formation of the track width control portion allows a track width of the magnetic head to be small. According to the present invention, the bottom face of the coil layer is disposed at a position lower than the bottom face of the track width control portion.

For example, the gap layer in the track width control portion is preferably composed of a nonmagnetic material, and the track width control portion may further include a top pole layer having a width smaller than the width of the front end of the top core layer in the second direction.

The track width control portion may further include a bottom pole layer composed of a magnetic material having a width smaller than the width of the first lifting layer in the second direction, the bottom pole layer being disposed between the gap layer and the first lifting layer.

According to the present invention, each turn of the coil layer preferably includes a bottom segment and a top segment, the top segment having a width larger than the width of the bottom segment.

The inorganic insulating layer is preferably composed of, for example, $SiO_2$.

In order to facilitate the formation of the top core layer, the method for manufacturing a magnetic head may further include the steps of: forming a third lifting layer on the second lifting layer; and connecting the top core layer to the third lifting layer.

The method for manufacturing a magnetic head according to the present invention may further include the steps of: forming a second coil layer on the insulating material directly or with another layer provided therebetween so as to be electrically connected to the coil layer; and forming an insulating layer on the second coil layer to form the top core layer on the insulating layer.

BRIEF DESCRIPTION OF THE DRAWINGS

FIG. 9 is a sectional view showing a step subsequent to the step in FIG. 8;

FIG. 10 is a sectional view showing a step subsequent to the step in FIG. 9;

FIG. 11 is a sectional view showing a step subsequent to the step in FIG. 10;

FIG. 12 is a sectional view showing a step subsequent to the step in FIG. 11;

DESCRIPTION OF THE PREFERRED EMBODIMENTS

Figure 1:
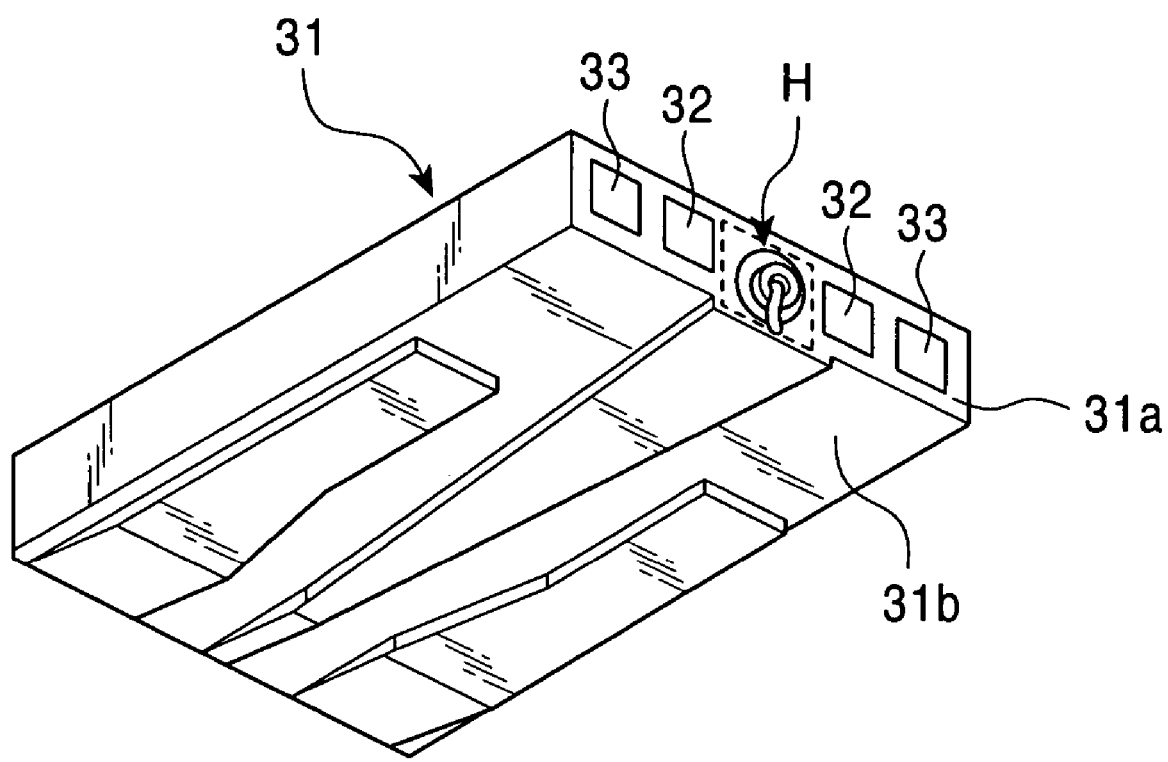
FIG. 1 is an overall perspective view illustrating a slider including a thin-film magnetic head according to the present invention.

Referring to FIG. 1, a magnetic head device includes a slider 31 made of $Al_2O_3$—TiC having a substantially rectangular parallelepiped shape. An opposing face 31b faces a recording medium, i.e., a hard magnetic disk. A magnetic head H, first terminal layers 32, and second terminal layers 33 are formed on an end face 31a of the trailing side of the slider 31. Coil layers disposed at an inductive head portion of the magnetic head H are connected to the second terminal layers 33. If a magnetoresistive sensor in a playback head is disposed, a sensing current flows from the first terminal layers 32 to the magnetoresistive sensor.

Figure 2:
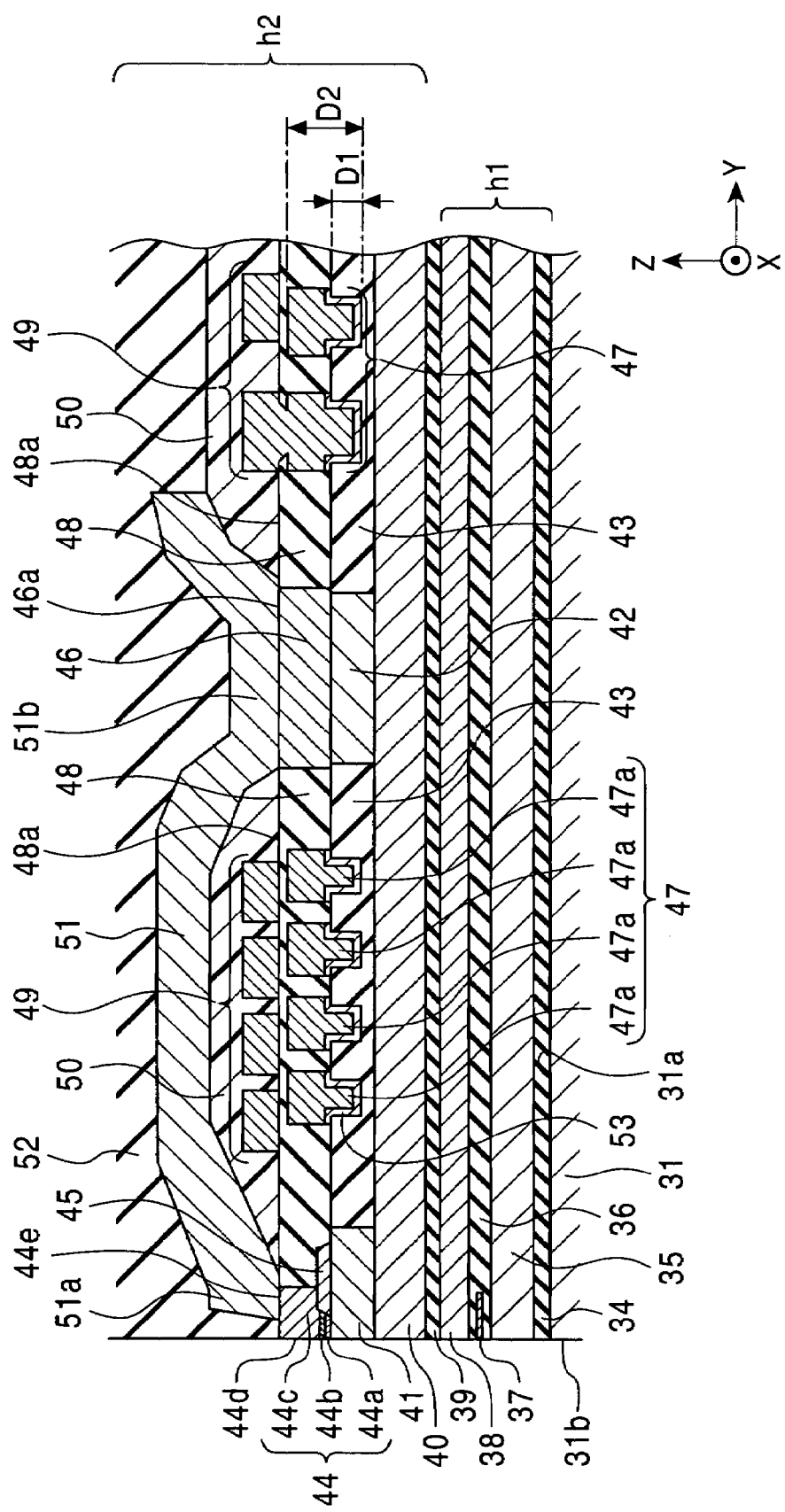
FIG. 2 is a partial sectional view of the thin-film magnetic head according to an embodiment of the present invention shown in FIG. 3 taken along line II—II, as viewed from the direction of arrows.

A magnetic head illustrated in FIG. 2 is formed on the end face 31a of the trailing side of the ceramic slider 31, which is a component of a floating head. The magnetic head is a magnetoresistive, i.e., MR/inductive combined thin-film magnetic head (hereinafter referred to as thin-film magnetic head) wherein an MR head h1 and an inductive head h2 for writing are layered.

The MR head h1 reads a recording signal by utilizing the magnetoresistive-effect to detect a leakage magnetic field from the recording medium such as a hard disk.

Referring to FIG. 2, an alumina layer 34 is formed on the end face 31a of the trailing side of the slider 31, and a bottom shield layer 35 composed of a magnetic material such as Ni—Fe alloy is formed on the alumina layer 34. A gap film 36 composed of an insulating material is formed on the bottom shield layer 35.

A magnetoresistive sensor 37, such as an anisotropic magnetoresistive (AMR) sensor, a giant magnetoresistive (GMR) sensor, or a tunnel magnetoresistive (TMR) sensor is formed in the gap film 36 in the height direction (the Y direction shown in FIG. 2) from the opposing face 31b facing the recording medium. A top shield layer 38 composed of a magnetic material such as Ni—Fe alloy is formed on the gap film 36. The MR head h1 includes stacked layers from the bottom shield layer 35 to the top shield layer 38.

A separating layer 39 composed of an insulating material such as alumina is formed on the MR head h1. An inductive head h2 is stacked on the separating layer 39 by a method for manufacturing the magnetic head of the present invention. In the inductive head h2, a bottom core layer 40 composed of a magnetic metal such as Ni—Fe alloy is formed by plating. The front end of the bottom core layer 40 is exposed at the opposing face 31b.

A first lifting layer 41 composed of a magnetic material is stacked on the bottom core layer 40 at the side of the opposing face 31b. A second lifting layer 42 composed of a magnetic material is stacked on the bottom core layer 40 at the back of the first lifting layer 41 in a first direction (the height direction, i.e., the Y direction shown in FIG. 2).

An inorganic insulating layer 43 is formed at a portion between the first lifting layer 41 and the second lifting layer 42 on the bottom core layer 40. The inorganic insulating layer 43 is also formed at the back of the second lifting layer 42 in the first direction (i.e., the height direction) on the bottom core layer 40. The first lifting layer 41 and the second lifting layer 42 are composed of, for example, Ni—Fe alloy. The inorganic insulating layer 43 is composed of $SiO_2$.

A track width control portion 44 is formed on the first lifting layer 41. The track width control portion 44 has a layered structure including three layers, i.e., a bottom pole layer 44a composed of a magnetic metal made by plating on the first lifting layer 41, a gap layer 44b composed of a nonmagnetic metal, such as Ni—P, made by plating on the bottom pole layer 44a, and a top pole layer 44c composed of a magnetic metal made by plating on the gap layer 44b.

The bottom pole layer 44a and the top pole layer 44c may be composed of the same magnetic material as in the bottom core layer 40 and a top core layer 51 and is preferably composed of a magnetic material having a saturation magnetic flux density higher than that of the magnetic material of the bottom core layer 40 and the top core layer 51. A front end 44d of the track width control portion 44 may be exposed at the opposing face 31b or maybe covered with a thin protective film.

The bottom pole layer 44a and the top pole layer 44c are composed of, for example, Ni—Fe alloy and the gap layer 44b is composed of, for example, Ni—P.

According to the present embodiment, a gap depth (i.e., Gd) determining layer 45 composed of an organic insulating material, an inorganic insulating material, or a nonmagnetic metal is formed at the back of the opposing face 31b in the first direction on the first lifting layer 41. The rear ends of the bottom pole layer 44a and the gap layer 44b of the track width control portion 44 are in contact with the front end, i.e., the end at a side of the opposing face 31b, of the Gd determining layer 45. The length in the Y direction of the gap layer 44b is determined by the position of the Gd determining layer 45. The rear end of the top pole layer 44c is disposed on the Gd determining layer 45.

A third lifting layer 46 composed of a magnetic metal such as Ni—Fe alloy is formed by plating at the back of the magnetic head in the Y direction on the second lifting layer 42. A top face 46a of the third lifting layer 46 is planarized in the same plane as the top face 44e of the track width control portion 44.

A groove having a plurality of turns is formed on the inorganic insulating layer 43 disposed between the first lifting layer 41 and the second lifting layer 42, and is formed on the inorganic insulating layer 43 disposed at the back of the second lifting layer 42 in the Y direction. The groove having a plurality turns is patterned in a spiral shape around the second lifting layer 42. A coil layer 47 (hereinafter referred to as first coil layer 47) having a plurality of turns is formed in the groove and the over the groove. The first coil layer 47 has a thickness D2, which is larger than the depth D1 of the groove. The first coil layer 47 is composed of copper. The first coil layer 47 may have a layered structure including a copper layer and nickel layer, which is a protective film. An insulating layer 48 is disposed between each of the turns 47*a* of the first coil layer 47 and is disposed on the first coil layer 47. According to the inductive head shown in FIG. 2, the thickness of the first coil layer 47 can be increased in the area between the top core layer 51 and the bottom core layer 40 as compared with a known inductive head.

Furthermore, the first coil layer 47 is formed by continuous plating.

In the continuous plating, the first coil layer 47 is formed on an underlayer 53 with a single plating bath and a current supply. More specifically, in the forming process of the first coil layer 47, a sample is not taken out from the plating bath and is not soaked again in the plating bath on the way of plating. Accordingly, the first coil layer 47 can be a conductive material layer being Pointless and having a uniform composition and a uniform structure, except for the portion of the underlayer 53. If the first coil layer 47 has a layered structure including a copper layer and a nickel layer, which is a protective film, the layer disposed under the protective film (for example, the copper layer) is formed by the continuous plating.

The inorganic insulating layer 43 and the insulating layer 48 are composed of an inorganic material, such as $SiO_2$, having a large thermal conductivity. Accordingly, heat generated from the first coil layer 47 is easily released.

A top face 48*a* of the insulating layer 48 is a flat surface and is formed on the same level of the top face 46*a* of the third lifting layer 46 and the top face 44*e* of the track width control portion 44.

A second coil layer 49 is formed on the insulating layer 48. The second coil layer 49 is patterned in a spiral shape around the third lifting layer 46. The center of the first coil layer 47 and the center of the second coil layer 49 are connected to each other by penetrating the insulating layer 48.

The second coil layer 49 is composed of copper. The second coil layer 49 may have a layered structure including a copper layer and a nickel layer.

The second coil layer 49 is covered with a coil-insulating layer 50 composed of an organic insulating material such as a resist. The coil-insulating layer 50 is disposed between each of the conductive layers of the second coil layer 49 and disposed on the second coil layer 49.

The top core layer 51 is formed on the coil-insulating layer 50. A base end 51*b* of the top core layer 51 is in contact with the top face 46*a* of the third lifting layer 46. A front end 51*a* of the top core layer 51 is in contact with the top face 44*e* of the track width control portion 44. The front end 51*a* of the top core layer 51 is not exposed at the opposing face 31*b*. The top core layer 51 is composed of a magnetic material, for example, Ni—Fe alloy.

The inductive head h2 is covered with a protective layer 52 composed of an insulating material, for example, AlSiO or $Al_2O_3$.

The first terminal layers 32 and the second terminal layers 33 shown in FIG. 1 are formed on the protective layer 52. The first terminal layers 32 and the second terminal layers 33 are composed of a metal having a small specific resistance, for example, Au, Ag, Pt, or Cu.

In the inductive head h2, an end (not shown in the figure) of the first coil layer 47 and an end (not shown in the figure) of the second coil layer 49 are electrically connected to, for example, one of the second terminal layers 33. The MR head h1 is electrically connected to, for example, the first terminal layers 32.

The first terminal layers 32 and the second terminal layers 33 function as bonding pads. Wires or leads in a flexible printed board connected to each of the terminal layers are electrically connected to an electrical circuit installed in the magnetic recording and playback apparatus.

Figure 3:
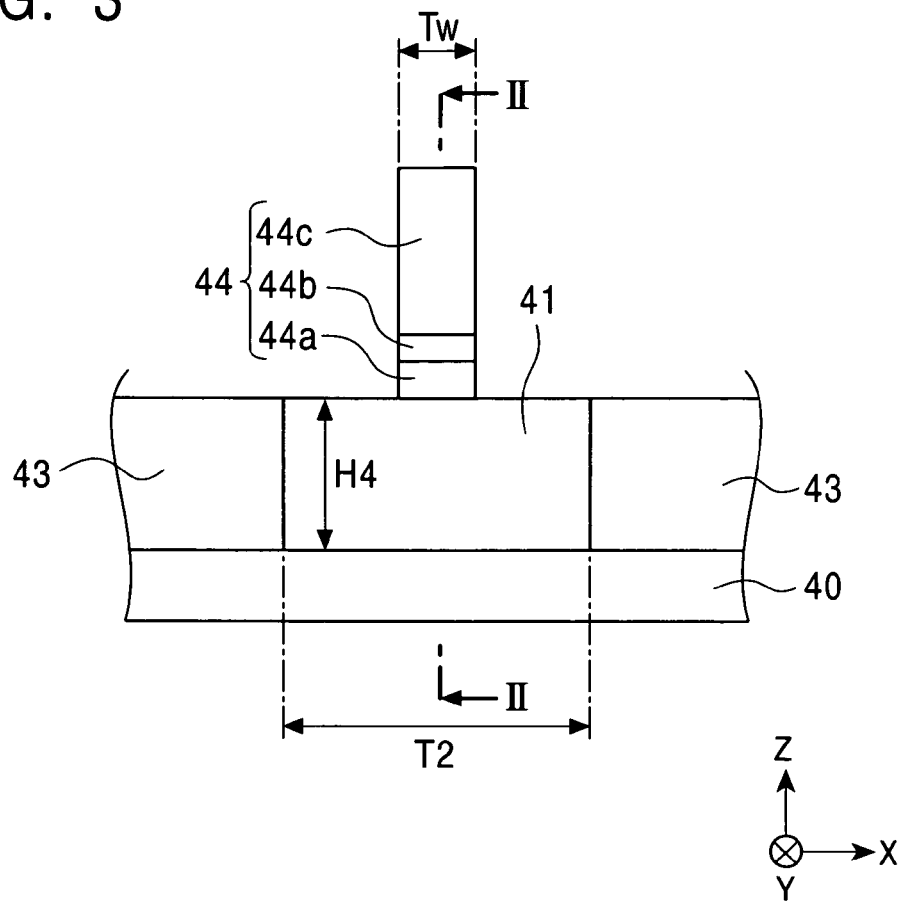
FIG. 3 is a front view of the thin-film magnetic head according to the embodiment of the present invention.
Figure 4:
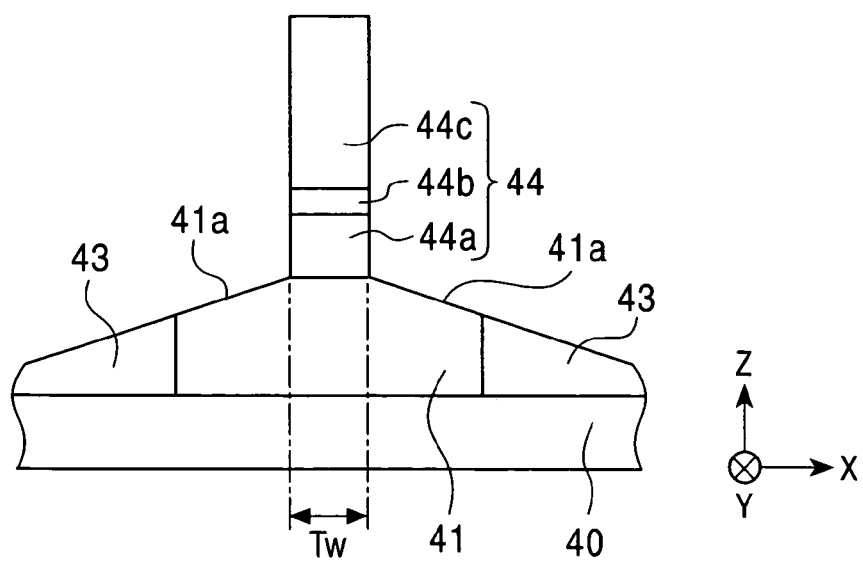
FIG. 4 is a front view of the thin-film magnetic head according to another embodiment of the present invention.

FIG. 3 is a partial front view of the structure of the inductive head h2 shown in FIG. 2, viewed from a surface facing the recording medium. FIG. 4 is a partial front view of the structure of the inductive head h2 according to another embodiment of the present invention.

Referring to FIG. 3, the first lifting layer 41 is formed on the bottom core layer 40. The first lifting layer 41 is exposed at the surface facing the recording medium as in the bottom core layer 40. The bottom face of the first lifting layer 41 is magnetically connected to the bottom core layer 40.

Referring to FIG. 3, the first lifting layer 41 has a width T2 in a track width direction, i.e., the X direction shown in FIG. 3. The width T2 must be larger than the width of the bottom pole layer 44*a* in the X direction.

The width T2 of the first lifting layer 41 is preferably in the range of 5 μm to 100 μm and the height H4 of the first lifting layer 41 is preferably in the range of 1 μm to 5 μm.

The width of the front end 44*d* of the track width control portion 44 in a second direction (the track width direction, i.e., the X direction shown in FIG. 3), which is orthogonal to the first direction, is smaller than the width in the second direction of the front end of the top core layer disposed on the track width control portion 44. The track width for recording in the inductive head h2 depends on the width in the second direction (i.e., the track width direction) of the front end 44*d* of the track width control portion 44. In order to achieve a thin-film magnetic head for high recording density, the track width Tw, i.e., the width of the front end 44*d* of the track width control portion 44, is preferably 0.7 μm or less, more preferably 0.5 μm or less.

Referring to FIG. 4, inclined planes 41*a*, 41*a* are formed from the base end of the bottom pole layer 44*a* to both sides of top faces of the first lifting layer 41 in the direction diverging from the top core layer. In this case, write fringing can be further appropriately prevented.

A method for manufacturing the magnetic head (inductive head) shown in FIGS. 2 and 3 will now be described.

FIGS. 5 to 13 illustrate the method for manufacturing the thin-film magnetic head according to the present invention as shown in FIGS. 2 and 3.

Figure 5:
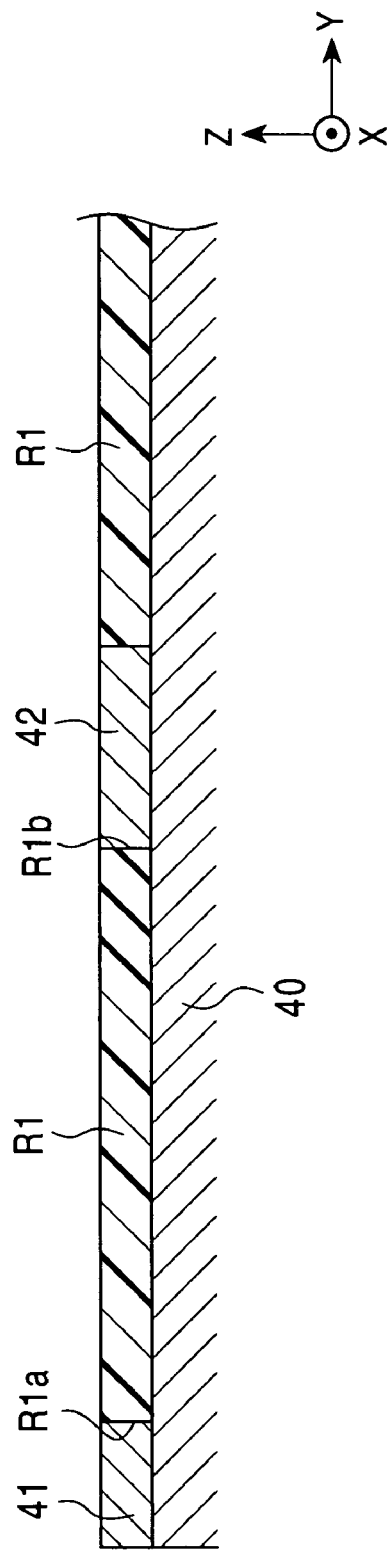
FIG. 5 is a sectional view showing a step in the method for manufacturing the inductive head in FIG. 2 according to the present invention.

Referring to FIG. 5, a resist layer R1 is coated on the bottom core layer 40 and is exposed and developed to form a groove R1*a* and an open hole R1*b*. The groove R1*a* has a predetermined length in the first direction (the height direction, i.e., the Y direction shown in FIG. 5) from the opposing face facing the recording medium and has a predetermined width in the second direction (the track width direction, i.e., the X direction shown in FIG. 5), which is orthogonal to the first direction. Furthermore, the open hole R1b is disposed at a position having a predetermined distance from the groove R1a in the resist layer R1 in the first direction. The first lifting layer 41 composed of a magnetic material such as Ni—Fe is formed in the groove R1a by plating. The second lifting layer 42 composed of a magnetic material such as Ni—Fe is formed in the open hole R1b by plating.

Figure 6:
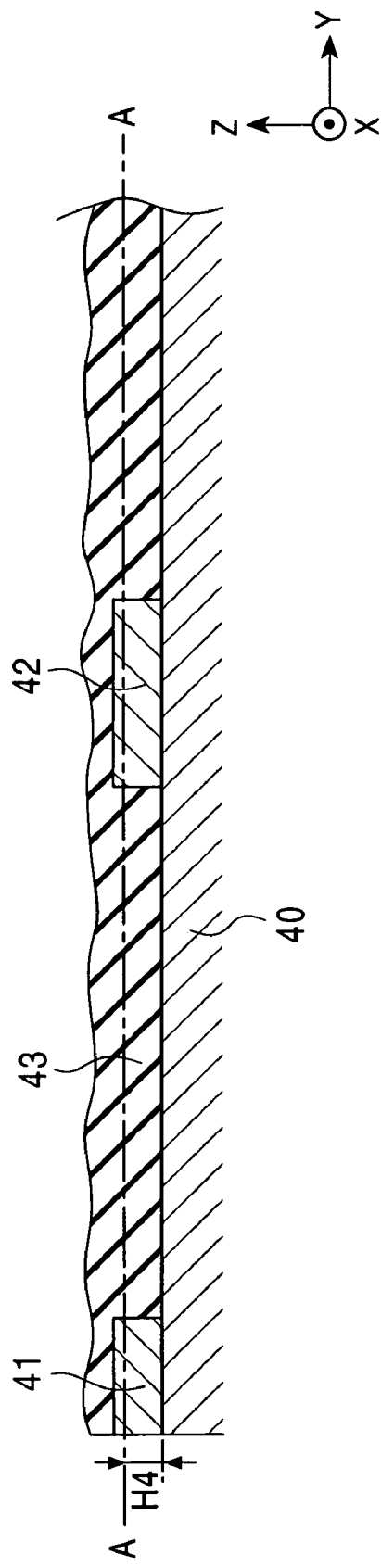
FIG. 6 is a sectional view showing a step subsequent to the step in FIG. 5.

After the formation of the first lifting layer 41 and the second lifting layer 42, the resist layer R1 is removed. Referring to FIG. 6, the inorganic insulating layer 43 is deposited on the bottom core layer 40, the first lifting layer 41, and the second lifting layer 42 by sputtering or vapor deposition. The inorganic insulating layer 43 is composed of $SiO_2$.

After the deposition of the inorganic insulating layer 43, the surface of the inorganic insulating layer 43 is ground by, for example, chemical mechanical polishing (i.e., CMP) such that the first lifting layer 41 and the second lifting layer 42 has the height H4 as illustrated by line A—A in FIG. 6.

Figure 7:
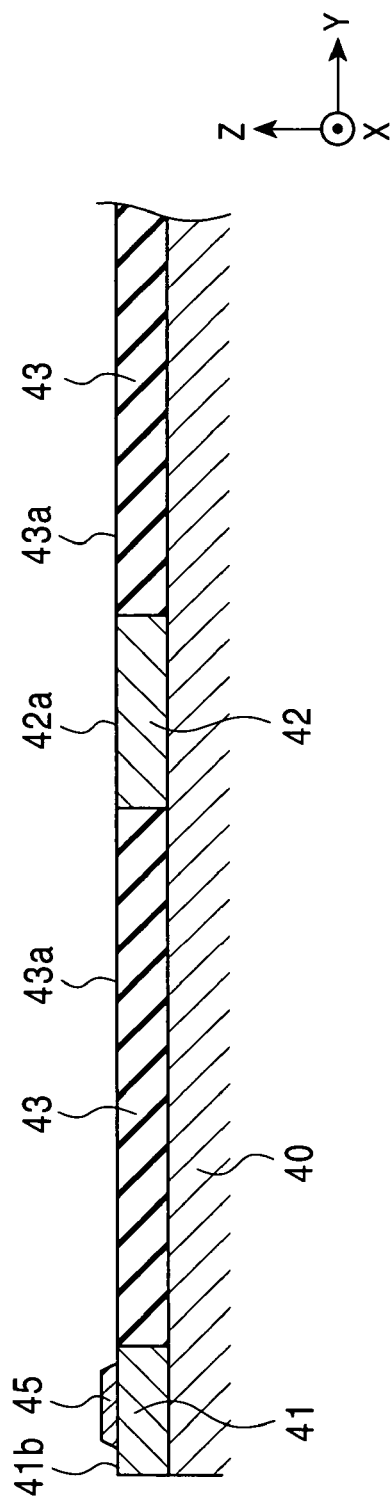
FIG. 7 is a sectional view showing a step subsequent to the step in FIG. 6.

A top face 41b of the first lifting layer 41, a top face 42a of the second lifting layer 42, and a top face 43a of the inorganic insulating layer 43 are planarized by the chemical mechanical polishing. Referring to FIG. 7, the top faces 41b, 42a, and 43a are formed on the same level.

Referring to FIG. 7, the Gd determining layer 45 composed of an organic material such as a resist, an inorganic material such as $SiO_2$, or a nonmagnetic metal such as Cu is formed at a predetermined position on the first lifting layer 41.

Figure 8:
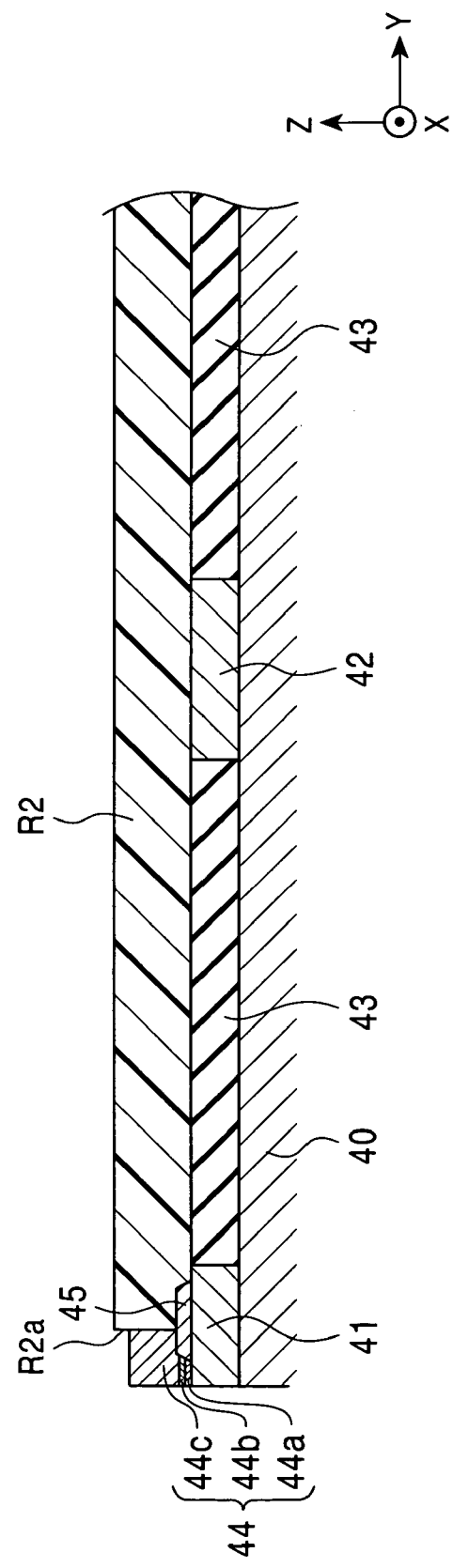
FIG. 8 is a sectional view showing a step subsequent to the step in FIG. 7.

Referring to FIG. 8, a resist layer R2 is coated on the first lifting layer 41, the second lifting layer 42, and the inorganic insulating layer 43 and is exposed and developed to form a groove R2a. The groove R2a has a predetermined length in the first direction from the opposing face facing the recording medium and has a predetermined width in the second direction (the track width direction, i.e., the X direction shown in FIG. 8). Then the track width control portion 44 is formed in the groove R2a by plating.

Referring to FIG. 8, the track width control portion 44 includes the bottom pole layer 44a, the gap layer 44b, and the top pole layer 44c, which are formed in turn from the bottom by plating.

The layer structure of the track width control portion 44 formed in the groove R2a is not limited to the three-layered structure described above. Namely, the track width control portion 44 may have any layer structure as long as the track width control portion 44 includes the bottom pole layer 44a connected to the bottom core layer 40 and/or the top pole layer 44c connected to the top core layer, and the gap layer 44b disposed between one of the core layers and the one of the pole layers or between both pole layers.

As described above, the gap layer 44b is preferably formed by plating together with the pole layers. The nonmagnetic metal used as the gap layer 44b, which can be formed by plating, is preferably at least one component selected from the group consisting of Ni—P, Ni—Pd, Ni—W, Ni—Mo, Au, Pt, Rh, Pd, Ru, and Cr.

Accordingly, the bottom pole layer 44a, the gap layer 44b, and the top pole layer 44c can be formed by continuous plating.

Referring to FIG. 9, a resist layer R3 covers the track width control portion 44 in order to protect the track width control portion 44 formed by plating.

Referring to FIG. 9, a resist layer R4 is coated on the first lifting layer 41, second lifting layer 42, and the inorganic insulating layer 43. A through-groove, having a plurality of turns is patterned in a spiral shape around the second lifting layer 42. The through-groove, having a plurality of turns passes through the area between the first lifting layer 41 and the second lifting layer 42.

Furthermore, a groove 43b, having a plurality of turns is formed in the inorganic insulating layer 43 by reactive ion etching with $CF_4$ gas. The resist layer R4 is used as a mask to form the groove 43b. The groove 43b is patterned in the spiral shape around the second lifting layer 42. When the groove 43b is formed by ion milling, the sidewalls of the groove 43b have inclined planes being tapered against the top face 43a of the groove 43b. On the other hand, the reactive ion etching allows the sidewalls of the groove 43b to be etched in the direction vertical to the top face 43a.

The groove 43b passes through the area between the first lifting layer 41 and the second lifting layer 42.

After the formation of the groove 43b, referring to FIG. 10, the underlayer 53 on which the first coil layer 47 is formed by plating is formed by sputtering. An example of the underlayer 53 includes a Cr layer and a Ti layer formed thereon.

Referring to FIG. 11, a resist layer R5 is coated on the underlayer 53, and then a through-groove is formed in a pattern on the resist layer R5 where the groove 43b of the inorganic insulating layer 43 is overlapped. Referring to FIG. 11, the through-groove has a width W3 larger than the width W2 of the groove 43b. The absolute values of the width W2 of the groove 43b and the width W3 of the through-groove are not necessarily constant in all positions and may be changed depending on the position. However, according to the relative values of the width W3 and the width W2, both of which are overlapped by each other, the width W3 of the through-groove disposed at upper side is always larger than the width W2 of the groove 43b disposed at the lower side. Accordingly, the opening of the groove 43b is entirely exposed in the opening of the through-groove. That is, the opening of the groove 43b is not blocked by the resist layer R5.

In the next step, a first coil layer 47 composed of copper is formed by continuous plating on the underlayer 53, which is used as an under layer for the plating. Specifically, the first coil layer 47 is formed in the areas from the interior of the groove 43b to the interior of the through-groove in the resist layer R5. In the continuous plating, the first coil layer 47 is formed with a single plating bath and a current supply. That is, in the forming process of the first coil layer 47, a sample is not taken out from the plating bath and is not soaked again in the plating bath on the way of plating.

Accordingly, the first coil layer 47 can be a conductive material layer (i.e., Cu layer) being Pointless and having a uniform composition and a uniform structure. Furthermore, this process simply and rapidly allows the first coil layer 47 to have a large thickness.

According to the present invention, the resist layer R4 having the thickness H1 (see FIG. 9) is used as a mask to form the groove 43b, and resist layer R5 having the thickness H2 (see FIG. 11) is used as a frame to form the first coil layer 47 by frame plating. Accordingly, in order to form the first coil layer 47 having a thickness D2 (see FIG. 12), the method for manufacturing the magnetic head of the present invention does not require the patterning of a resist layer, i.e. frame, having a thickness larger than the thickness D2 of the first coil layer 47. Instead, a resist layer having a small thickness is patterned twice to form the first coil layer 47 having a thickness D2. A thin resist layer allows a high precision patterning, therefore, the dimensional accuracy and the location accuracy of the first coil layer 47 can be enhanced according to the present invention.

Although the first coil layer 47 has a single layer composed of copper in FIG. 11, a nickel layer, i.e., a protective film to prevent oxidation may be formed on the copper layer after the continuous plating.

After the formation of the first coil layer 47 by plating, the resist layer R5 is removed. Then the unnecessary portion, i.e., the exposed portion of the underlayer 53 is removed by, for example, ion milling. Furthermore, referring to FIG. 12, the third lifting layer 46 composed of a magnetic material such as Ni—Fe alloy is formed on the second lifting layer 42 by plating. Then the resist layer R3 covered with the track width control portion 44 is removed.

Referring to FIG. 12, the plated first coil layer 47 formed by the manufacturing method according to the present embodiment has the thickness D2 larger than a depth D1 of the groove 43b.

As illustrated in FIG. 11, the through-groove has the width W3 larger than the width W2 of the groove 43b, and the opening of the groove 43b is entirely exposed in the opening of the through-groove. Accordingly, the first coil layer 47 readily has a uniform structure. Since the width W3 of the through-groove is larger than the width W2 of the groove 43b, the width of top segments 47c of the first coil layer 47 is larger than the width of the bottom segments 47b of the first coil layer 47 (see FIGS. 11 and 12).

Figure 13:
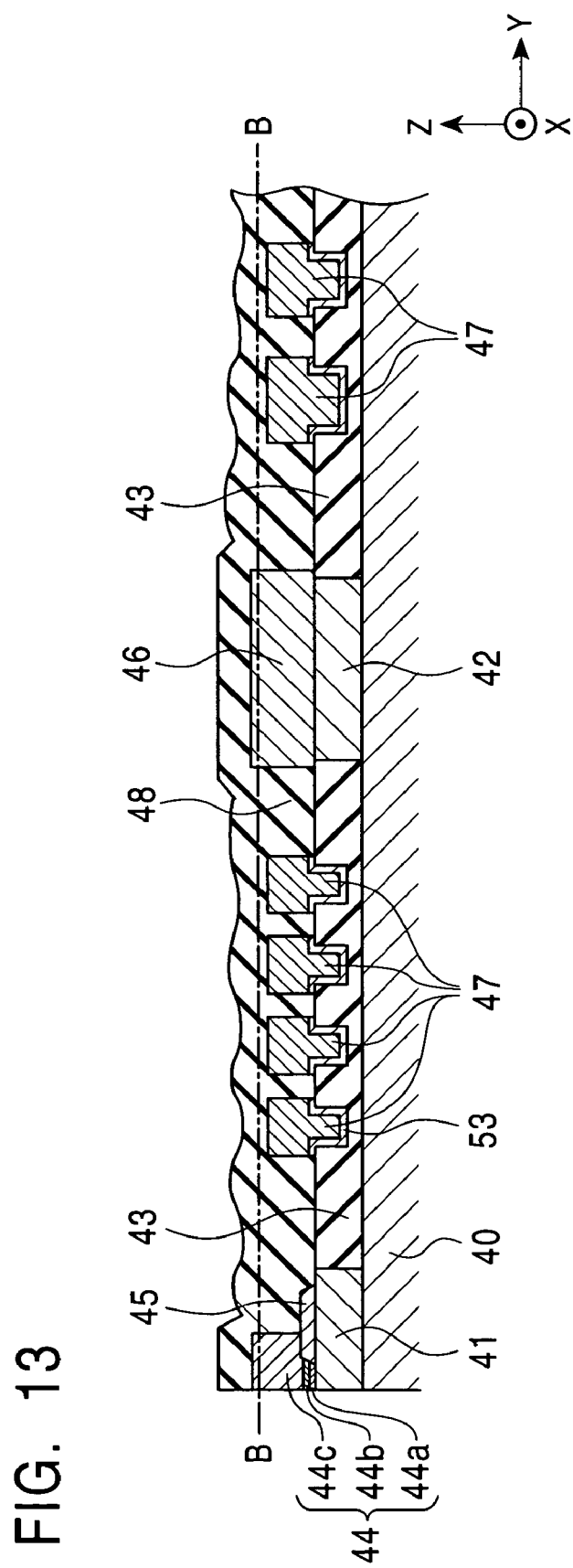
FIG. 13 is a sectional view showing a step subsequent to the step in FIG. 12.
Figure 14:
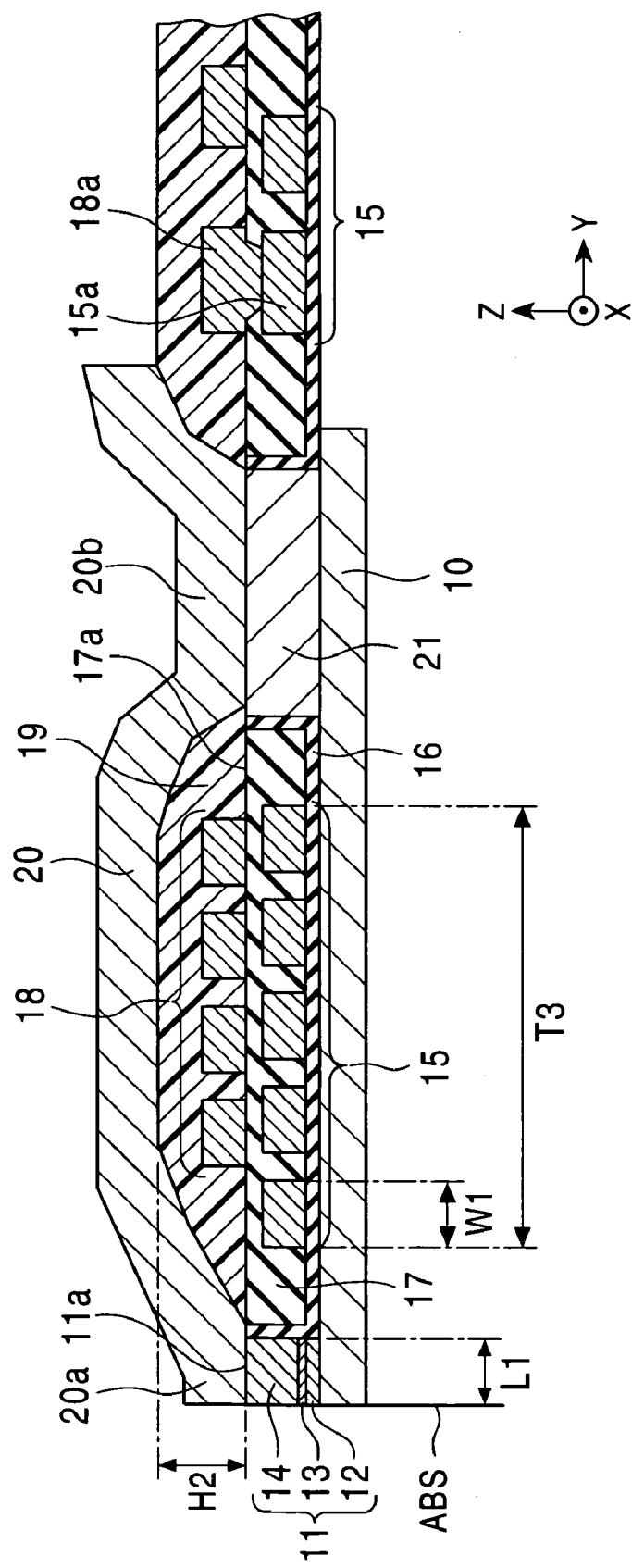
FIG. 14 is a partial sectional view of a thin-film magnetic head according to a known manufacturing method.

Referring to FIG. 13, an insulating material is deposited between each of the turns 47a of the first coil layer 47 and is deposited on the first coil layer 47 by, for example, sputtering or vapor deposition to form the insulating layer 48. The insulating layer 48 is composed of an inorganic material such as alumina or $SiO_2$.

After the deposition of the insulating layer 48, the surface of the insulating layer 48 is ground by, for example, CMP to the line B—B where the surface of the track width control portion 44 and the surface of the third lifting layer 46 are exposed.

The top faces of the track width control portion 44, the third lifting layer 46, and the insulating layer 48 are planarized and are formed on the same level by the CMP.

As described above, the top face 48a of the insulating layer 48, which covers the first coil layer 47, is planarized by the polishing. Then the second coil layer 49 is formed on the top face 48a of the insulating layer 48 by plating such that the second coil layer 49 is patterned in a spiral shape around the third lifting layer 46. The center of the first coil layer 47 and the center of the second coil layer 49 are connected to each other by penetrating the insulating layer 48.

The second coil layer 49 is also composed of copper. The second coil layer 49 may have a layer structure including a copper layer and a nickel layer.

Then the second coil layer 49 is covered with the coil-insulating layer 50 composed of an organic insulating material such as a resist. The coil-insulating layer 50 is disposed between each of the turns of the second coil layer 49 and disposed on the second coil layer 49.

The top core layer 51 is formed on the coil-insulating layer 50, thus forming the inductive head h2 shown in FIG. 2. The base end 51b of the top core layer 51 is in contact with the top face 46a of the third lifting layer 46, and the front end 51a of the top core layer 51 is in contact with the top face 44e of the track width control portion 44. The front end 51a of the top core layer 51 is formed at the back from the opposing face 31b in the Y direction shown in FIG. 2 so that the front end 51a is not exposed at the opposing face 31b. The top core layer 51 is composed of a magnetic material, for example, Ni—Fe alloy.

After performing the steps described above, the first coil layer 47 is disposed at the area crossing over the inorganic insulating layer 43 and the insulating layer 48. Accordingly, the thickness D2 of the first coil layer is increased as compared with the thickness of a coil layer manufactured by a known method. For example, the depth D1 of the groove 43b is from 1 µm to 3 µm, the thickness D2 of the first coil layer 47 is from 2 µm to 6 µm.

Thus, the expansion of the cross-sectional area of the first coil layer 47 allows the resistance of the first coil layer 47 to decrease.

Furthermore, the cross-sectional area of the first coil layer 47 is expanded by increasing the thickness of the first coil layer 47. Therefore, the increase of the width is not required in the first coil layer 47. Accordingly, the dimension of the bottom core layer and the top core layer are maintained to be small, thereby preventing the inductance of the magnetic head from increasing. Furthermore, since the inorganic insulating layer 43 and the insulating layer 48 are composed of a material having a large thermal conductivity, the heat generated from the first coil layer 47 is easily released.

In particular, the resistance at the front portion of the first coil layer 47, i.e., the portion close to the opposing face facing the recording medium rather than the second lifting layer 42 can be reduced, thereby reducing the heat generation at the first coil layer 47.

Accordingly, the protrusion from the opposing face of the slider facing the recording medium due to the expansion of the magnetic head by the heat from the first coil layer 47 can be suppressed.

Even if a recording current applied to the first coil layer 47 has a high frequency in order to achieve a high recording density, the heat generation at the first coil layer 47 can be suppressed, thereby suppressing the protrusion.

In a magnetic recording apparatus for high-density recording and high-speed recording, the gap between the recording medium and the slider is small. According to the present invention, since the protrusion of the magnetic head can be suppressed, the magnetic head is not frequently in contact with the magnetic recording medium, thus preventing the damage of the recording medium or the damage of the recording head itself.

The top face 44e of the track width control portion 44 must be flattened in order to ensure the junction between the top core layer 51 and the track width control portion 44; therefore, the top face 48a of the insulating layer 48 must be also flattened. According to the magnetic head of the present embodiment, the first coil layer 47 is disposed extending at a position lower than the bottom face of the track width control portion 44. Accordingly, the thickness of the first coil layer 47 can be increased, while the top face 48a of the insulating layer 48 is a flat surface and is formed on the same level of the top face 44e of the track width control portion 44.

In order to form the inductive head having the leading end shown in FIG. 4, the following step is added in the method described in the above embodiment. The track width control portion 44 is formed by plating as in FIG. 8. And then the track width control portion 44 and the top face of the first lifting layer 41 are ground by ion milling from the upper, offset direction.

What is claimed is:

1. A method for manufacturing a magnetic head, comprising the steps of:
    (a) forming a bottom core layer by plating;
    (b) forming a first lifting layer comprising a magnetic material and a second lifting layer comprising a magnetic material such that a gap is formed between the first lifting layer and the second lifting layer in a first direction;
(c) forming an inorganic insulating layer on the bottom core layer;
(d) forming a groove having a plurality of turns in the inorganic insulating layer, the groove being disposed around the second lifting layer and a front portion of the groove being disposed between the first lifting layer and the second lifting layer;
(e) forming a coil layer, having a plurality of turns and having a thickness larger than a depth of the groove, in the groove and the over the groove by continuous plating;
(f) insulating each area between the turns of the coil layer with an insulating material; and
(g) forming a gap layer comprising a nonmagnetic material, and a top core layer comprising a magnetic material, the top core layer being connected to the second lifting layer and facing the first lifting layer with the gap layer provided therebetween.

2. The method for manufacturing a magnetic head according to claim 1, further comprising the step of:
forming a part of track width control portion on the first lifting layer, the track width control portion including the gap layer and having a width smaller a the width of a front end of the top core layer, in a second direction orthogonal to the first direction.

3. The method for manufacturing a magnetic head according to claim 2, wherein the gap layer in the track width control portion comprises a nonmagnetic material, and the track width control portion further comprises a top pole layer having a width smaller than the width of the front end of the top core layer in the second direction.

4. The method for manufacturing a magnetic head according to claim 2, wherein the track width control portion further comprises a bottom pole layer comprising a magnetic material having a width smaller than a width of the first lifting layer in the second direction, the bottom pole layer being disposed between the gap layer and the first lifting layer.

5. The method for manufacturing a magnetic head according to claim 1, wherein each turn of the coil layer comprises a bottom segment and a top segment, the top segment having a width larger than a width of the bottom segment.

6. The method for manufacturing a magnetic head according to claim 1, wherein the inorganic insulating layer comprises $SiO_2$.

7. The method for manufacturing a magnetic head according to claim 1, further comprising the steps of:
forming a third lifting layer on the second lifting layer; and
connecting the top core layer to the third lifting layer.

* * * * *